United States Patent [19]

McManus et al.

[11] Patent Number: 5,141,352
[45] Date of Patent: Aug. 25, 1992

[54] SEAT BELT ANCHOR

[75] Inventors: Michael F. McManus, Birmingham; Robert Lawery, New Boston, both of Mich.; Michael C. Shutt, Sylvania, Ohio

[73] Assignee: Header Products, Inc., Romulus, Mich.

[21] Appl. No.: 648,292

[22] Filed: Jan. 31, 1991

[51] Int. Cl.⁵ .............................................. F16B 9/00
[52] U.S. Cl. .................................. 403/192; 403/199; 403/262; 72/333; 29/558; 280/801
[58] Field of Search ..................... 297/468, 470, 482; 280/801; 24/115 A; 403/199, 192, 262; 72/333, 334; 29/425, 557, 558

[56] References Cited

U.S. PATENT DOCUMENTS

| | | | |
|---|---|---|---|
| 2,323,758 | 7/1943 | Temple, Jr. | 762/333 |
| 4,915,451 | 4/1990 | Forget et al. | 280/801 |
| 4,928,992 | 5/1990 | Qvint et al. | 280/801 |

FOREIGN PATENT DOCUMENTS 1117406 2/1956 France .................. 403/192

Primary Examiner—Andrew V. Kundrat

[57] ABSTRACT

A seat belt anchor with a first leg which has a first shank carried by a first base. The shank is elongate, generally tubular, with a top, a longitudinal axis, and an axial recess. The axial recess has an end which is open to the top of the shank. The base, which carries the shank, is generally flat with top and bottom surfaces and a hole for receiving a bolt.

The first base is joined to the first shank at the end of the shank distal from the top of the shank and the open end of the recess. The longitudinal axis of the first shank is curved toward the top of the first base at a first curving angle A which is less than 180 degrees, desirably, 110 to 140 degrees and preferably about 135 degrees.

The first curving angle A has an apex which is disposed a first selected distance from the top of the first shank.

The seat belt anchor has a second leg similar to the first leg.

The first base is disposed over the second base and arranged with longitudinal axes of the first and second respective bases being crossed one over the other and the holes in alignment. The first and second shanks are bent toward one another and have respective first and second bending angles C and D.

The first and second bending angles are each selected so that the recesses are within about 10 degrees of being parallel with respect to each other when the first and second bases are arranged as described immediately above.

A method of making the seat belt anchor of the invention is also provided.

19 Claims, 2 Drawing Sheets

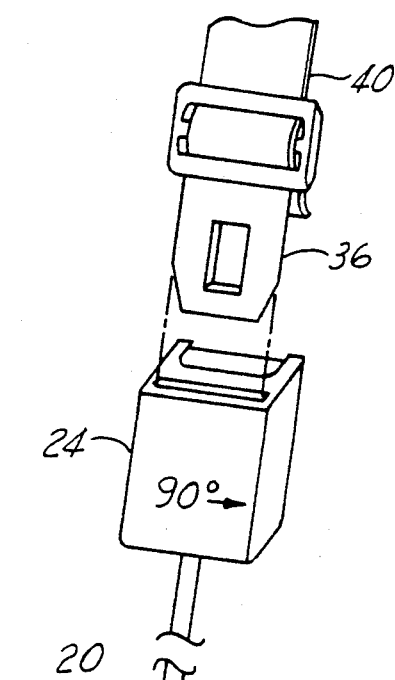
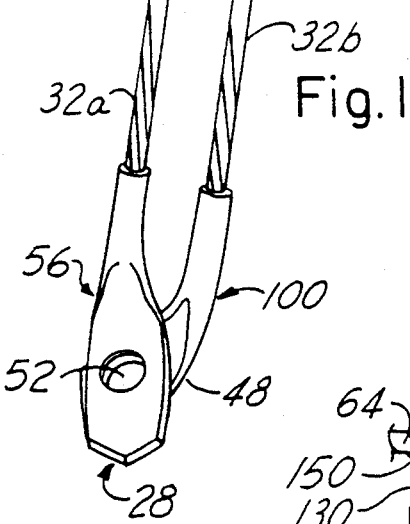
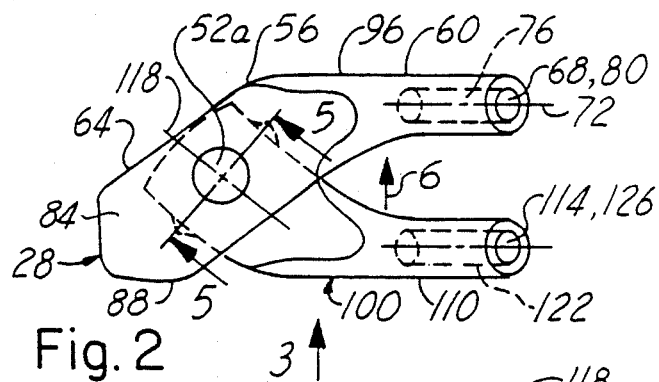
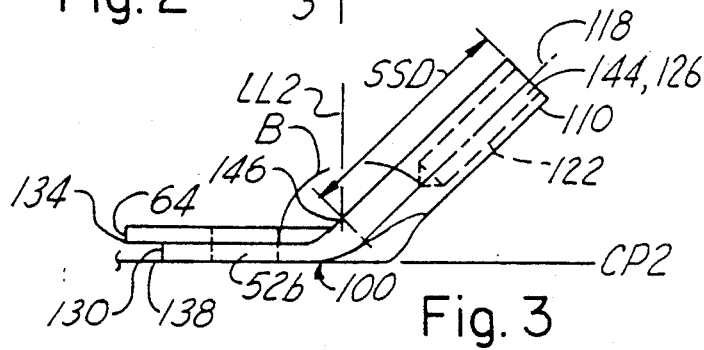
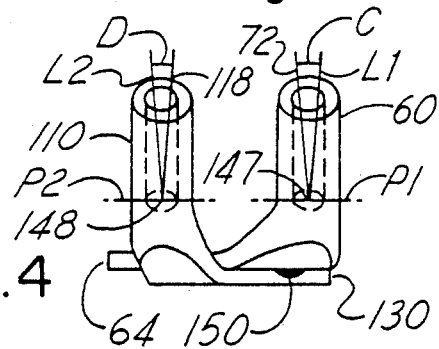
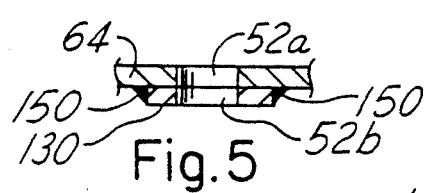
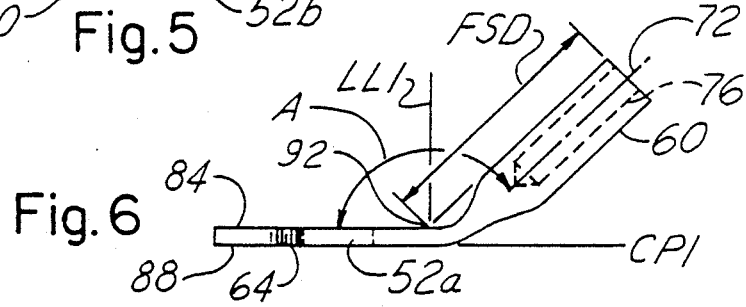

SEAT BELT ANCHOR

FIELD OF THE INVENTION

This invention relates to a seat belt anchor for use with a seat belt system to secure a passenger in a vehicle, and a method of making the seat belt anchor.

BACKGROUND OF THE INVENTION

A seat belt system typically has at one end a buckle secured to an anchor, another end with a retraction mechanism and a strap which is fed from the retraction mechanism, folds over the passenger, and is engaged by a locking mechanism of the buckle. The buckle is secured to the anchor by one or two cables. The cables are received and retained in recesses in the seat belt anchor and a base of the anchor is typically bolted to the vehicle floor pan. Each cable must be arranged in a suitable orientation to the buckle. The anchor, which secures the cable, must be arranged in a suitable orientation to the cables, the buckle and to the floor of the vehicle.

There are many types and configurations of seat belt anchors used with vehicle seat belt systems. Typically, such anchors are formed with one or two recesses defined by walls and carried by a base. Although an anchor has one (single) or two (double) recesses, depending on whether one or two cables are used, currently, double cables are preferred to attach to seat belt buckle assemblies.

Seat belt anchors, constructed and arranged to receive two cables (double anchors) are currently prepared by a forging method. Applicants' forged double anchor is a typical example. The forged double anchor is formed from a blank by forging two shanks and a base from a blank. Recesses are then drilled in the shanks and a hole for receiving a bolt is punched in the base. Machining is required to remove excess material and achieve a smooth surface.

The forging process is relatively labor extensive in that it requires a number of steps, the forging, the drilling and the machining. In performing these steps, a significant amount of material is wasted. Typically, 50 percent or more of the material of the blank is wasted when forming the double anchor part in a forging process. Further, the shape and configuration of the final product is limited due to the inherent limitations of the forging process. Thus, the cables are often bent between the anchor and buckle to achieve a proper orientation between the buckle, cable and anchor.

There are also single cable anchors and cable connectors which each have a recess in a tubular shank carried by a flat base. A single cable is secured in the recess of the single cable anchors or connectors. Single cable anchors and connectors are formed by a process which includes cold headed extrusion to form a single recess in one end of a blank.

There is a need to provide a method to form a double seat belt anchor which is economical, requires less steps than current methods, and minimizes material waste. There is also a need to provide a double seat belt anchor which has two recesses, defined by walls and carried by a base, in parallel spaced apart relation; which has the recesses disposed at a desired angle with respect to a base and at a desired orientation with respect to a pair of cables to be received in the recesses; and which is constructed and arranged so as to be formable by a process which is economical.

SUMMARY OF THE INVENTION

A seat belt anchor with a first leg which has a first shank carried by a first base. The shank is elongate, generally tubular, with a top, a longitudinal axis, and an axial recess. The axial recess has an end which is open to the top of the shank. The base, which carries the shank, is generally flat with top and bottom surfaces and a hole for receiving a bolt.

The first base is joined to the first shank at the end of the shank distal from the top of the shank and the open end of the recess. The longitudinal axis of the first shank is curved toward the top of the first base at a first curving angle A which is less than 180 degrees, desirably, 110 to 140 degrees and preferably about 135 degrees.

The first curving angle A has an apex which is disposed a first selected distance from the top of the first shank.

The seat belt anchor has a second leg similar to the first leg with a second shank which is elongate, generally tubular, with a top, a longitudinal axis, and an axial recess with an end open to the top of the second shank. A second base, which carries the second shank, is generally flat with top and bottom surfaces and a hole for receiving a bolt. The longitudinal axis of the second shank is curved toward the top of the second base at a second curving angle B which less than 180 degrees, desirably, 110 to 140 degrees and preferably about 135 degrees.

The second curving angle has an apex which is disposed a second selected distance from the top of the second shank, and the second selected distance is greater then the first selected distance.

The first base is disposed over the second base and arranged with longitudinal axes of the first and second respective bases being crossed one over the other and the holes in alignment. The first and second shanks are bent toward one another and have respective first and second bending angles C and D. The angle C has one leg which is the longitudinal axis of the first shank and a second leg which is a line L1 perpendicular to a plane P1 in which an apex of angle C lies. Preferably, plane P1 is parallel to the first base. The angle D has one leg which is the longitudinal axis of the second shank and a second leg which is a line L2 perpendicular to a plane P2 in which an apex of angle D lies. Preferably, plane P2 is parallel to the second base. The first and second bending angles are each selected so that the recesses are within about 10 degrees of being parallel with respect to each other when the first and second bases are arranged as described immediately above. The first and second bending angles are each desirably 5 to 35 degrees and preferably about 15 degrees. Preferably, the first and second bending angles are equal.

Preferably, the first and second bases are joined together by means of a weld joint.

In the method of making the seat belt anchor of the invention, first and second elongate metal blanks, each having two ends and a longitudinal axis, are placed in the bore of a die adapted to receive a punch. In order to cause a shank with a recess to be formed in one end of each of the blanks, the punch is forced into the bore in a direction along the longitudinal axis of each of the blanks while permitting the metal to flow in an annular gap between the punch and bore in a direction opposite the direction of movement of the punch, thereby causing the shank with the recess to be formed in the one end of each of the blanks.

Each blank is then bent at a respective bending angle C, D which are preferably about the same. The other end of the blank is flattened to form a base while orienting each of the blanks such that the shank, the base and the bending angle are all in a common plane CP.

In order to secure the base of the shank to a vehicle, a hole is punched in the blank for receiving a bolt.

The shanks are then each curved in a direction toward a line LL, perpendicular to the common plane CP. Preferably, one of the blanks is curved at a first curving angle and an apex of the first curving angle is at a first selected distance below the open end of the recess of the first shank.

Preferably, one of the blanks is curved at a second curving angle and an apex of the second curving angle is at a second selected distance below the open end of the recess of the second shank.

The second selected distance is greater than the first selected distance, such that when the first base is placed over the second base, and arranged with longitudinal axes of the bases crossed and with the respective holes in alignment, the respective recesses are within 10 degrees of being parallel to each other. Preferably, the recesses are parallel and the openings of the recesses lie in a common plane.

Objects, features and advantages of this invention are minimal material waste, economical and relatively cost efficient to manufacture, use and install; proper orientation of the anchor with respect to the seat belt cables, buckle and floor pan of the vehicle to which the anchor is secured.

BRIEF DESCRIPTION OF THE DRAWINGS

FIG. 1 is a perspective view of a portion of a seat belt system with an anchor which embodies the invention.

FIG. 2 is a perspective view of the seat belt anchor of FIG. 1.

FIG. 3 is a view taken in the direction of the arrow 3 of FIG. 1.

FIG. 4 is a rear view of the seat belt anchor of FIG. 1.

FIG. 5 is a fragmentary section view taken along 5—5 of FIG. 1.

FIG. 6 is a view taken in the direction of the arrow 6 of FIG. 1.

FIGS. 7, 8, 9A, 9B, 10B, 10C, 11A, 11B, 12A, 12B, 13A and 13B are diagrammatic views of blanks as formed by respective steps of a method of the invention which forms the seat belt anchor of FIG. 1.

DETAILED DESCRIPTION OF THE PREFERRED EMBODIMENTS

Figures 7, 8, 9A, 9B, 10A, 10B:
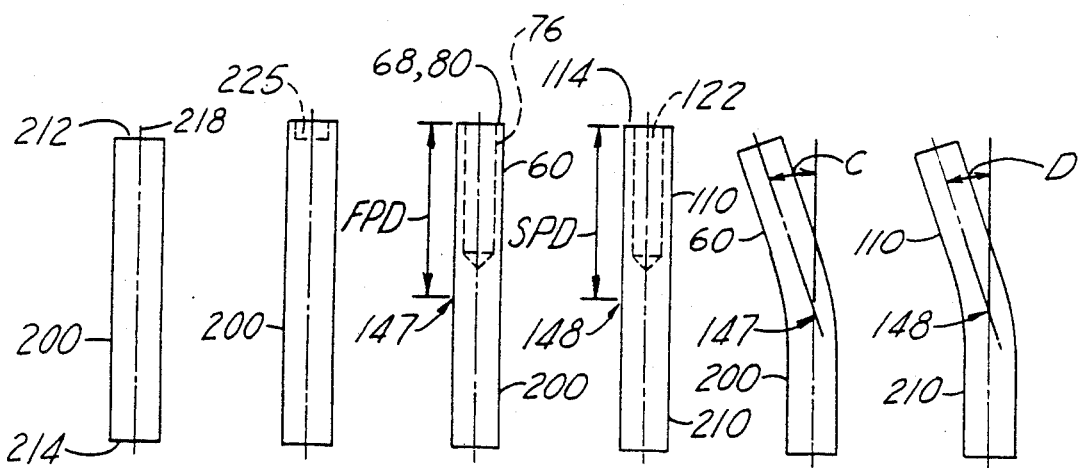

FIG. 1 shows an end 20 of a seat belt system, with a buckle 24 secured to an anchor 28. The buckle 24 is secured to the anchor 28 by a cable 32a, and the buckle 24 is constructed and arranged to secure a coupler 36 of a seat belt strap 40. In FIG. 1, the buckle 24, as shown, as been rotated 90 degrees in the direction of the arrow for purposes of illustration. A second buckle (not shown) is secured to the second cable 32b in a manner similar to the securing of the first buckle 24 to the first cable 32a. The cables 32a, 32b are received and retained in recesses 76, 122 of the anchor 28 (FIG. 2) and a base 48 of the anchor 28 has a hole 52 for passage of a bolt therethrough to secure the base to the floor of a vehicle (not shown).

The seat belt anchor has a first leg 56 which has a first shank 60 carried by a first base 64, (FIG. 6). The shank 60 is elongate, generally tubular, with a top 68, a longitudinal axis 72, and an axial recess 76. The axial recess 76 has an end 80 which is open to the top 68 of the shank 60. The first base 64, which carries the shank 60, is generally flat with top and bottom surfaces 84, 88 and a hole 52a for receiving a bolt (not shown).

The first base 64 is joined to the first shank 60 adjacent an end 96 of the shank 60 distal from the top 68 of the shank 60 and the open end 80 of the recess 76. The longitudinal axis 72 of the first shank 60 is curved toward the top surface 84 of the first base 64 at a first curving angle A which is less than 180 degrees, desirably, 110 to 140 degrees and preferably about 135 degrees.

The first curving angle A has an apex 92 which is disposed a first selected distance FSD from the top of the first shank 60.

The seat belt anchor 28 has a second leg 100 (FIG. 3) similar to the first leg 56 with a second shank 110 which is elongate, generally tubular, with a top 114, a longitudinal axis 118, and an axial recess 122 with an end 126 open to the top 114 of the second shank 110. A second base 130, which carries the second shank 110, is generally flat with top and bottom surfaces 134, 138 and a hole 52b for receiving a bolt (not shown). The longitudinal axis 118 of the second shank 110 is curved toward the top surface 134 of the second base 130 at a second curving angle B which less than 180 degrees, desirably, 110 to 140 degrees and preferably 135 degrees.

The second curving angle B has an apex 146 which is disposed a second selected distance SSD from the top 114 of the second shank 110, and the second selected distance SSD is greater than the first selected distance FSD.

The first base 64 is disposed over the second base 130 and arranged with longitudinal axes 72, 118 of the first and second respective bases 64, 130 being crossed one over the other and the holes 52a, 52b in alignment. (FIGS. 4 and 5). The first and second shanks 60, 110 are curved toward one another at respective first and second bending angles C, D. The first and second bending angles C, D are each selected so that the recesses 76, 122 are within about 10 degrees of being parallel with respect to each other when the first and second bases 64, 130 are arranged as described immediately above. The first and second bending angles C, D are each, desirably, 5 to 35 degrees and preferably about 15 degrees. Preferably, the first and second bending angles C, D are equal and have respective apexes 147, 148. The angle C has one leg which is the longitudinal axis 72 of the first shank 60 and a second leg which is a line L1 perpendicular to a plane P1 in which the apex 147 of angle C lies. Preferably, plane P1 is parallel to the first base 64. The angle D has one leg which is the longitudinal axis 118 of the second shank 110 and a second leg which is a line L2 perpendicular to a plane P2 in which the apex 148 of angle D lies. Preferably, plane P2 is parallel to the second base 130.

Preferably, the first and second bases 64, 130 are joined together by means of a weld joint 150.

In the method of making the seat belt anchor 28 of the invention, first and second elongate metal blanks each having two pair ends and a longitudinal axis are placed in the bore of a die adapted to receive a punch. In order to cause a shank with a recess to be formed in one end of each of the blanks, the punch is forced into the bore in a direction along the longitudinal axis of each of the blanks while permitting the metal to flow in an annular gap between the punch and bore in a direction opposite the direction of movement of the punch, thereby causing the shank with the recess to be formed in the one end of each of the blanks.

Each blank is then bent at an angle which is preferably the same. The other end of the blank is flattened to form a base while orienting each of the blanks such that the shank, the base and the bending angle are all in a common plane.

In order to secure the base of the shank to a vehicle, a hole is punched in the blank for receiving a bolt.

The shanks are then each curved in a direction toward a line LL, perpendicular to the common plane CP. Preferably, one of the blanks is curved at a first curving angle and an apex of the first curving angle is at a first selected distance below the open end of the recess of the first shank.

Preferably, one of the blanks is curved at a second curving angle and an apex of the second curving angle is at a second selected distance below the open end of the recess of the second shank.

The second selected distance is greater than the first selected distance, such that when the first base is placed over the second base, and arranged with longitudinal axes of the bases crossed and with the respective holes in alignment, the respective recesses are parallel and the openings of the recesses lie in a common plane thereby forming the seat belt anchor.

EXAMPLE 1

Figures 11A, 11B, 12A, 12B:
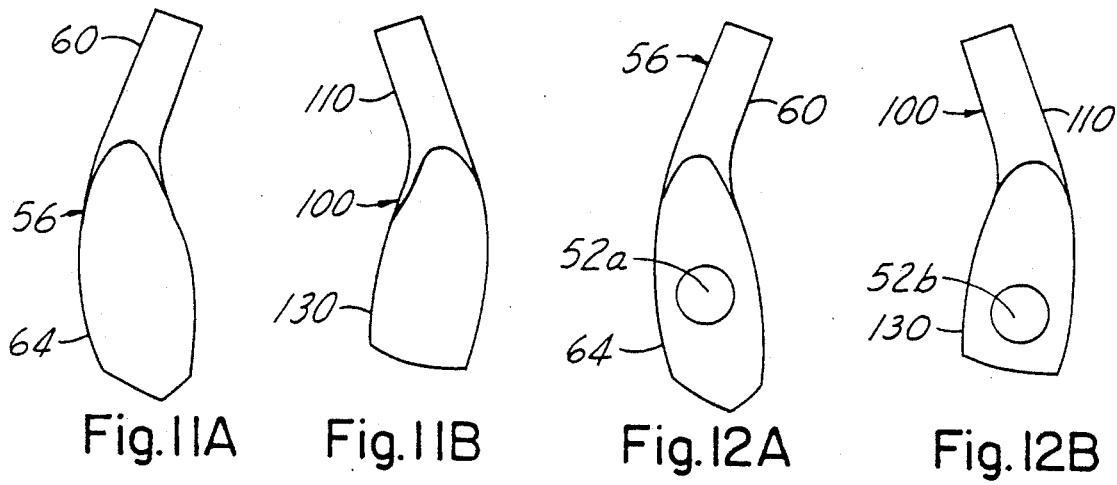
Figures 13A, 13B:
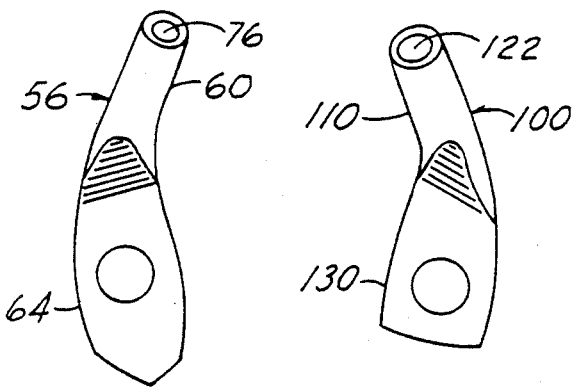

In this preferred example, a seat belt anchor 28 was prepared by the steps described below.

a) A first elongate, metal, cylindrical blank 200 was formed. The blank 200 had two ends 212, 214 and a longitudinal axis 218. The forming step included cutting a blank 200 of a desired length from 0.436 inch diameter coil of SAE 1022 steel of a spherodized and annealed quality;

b) The blank 200 was placed in the bore of a die adapted to receive a punch. The punch was driven into the bore to square off the ends 212, 214 of blank 200 (FIG. 7). Then the blank 200 was transferred to a second die position where the punch was driven a first distance into the blank 200 along its longitudinal axis 218 while permitting the metal of the blank 200 to flow in an annular gap between the punch and the bore in a direction opposite to the direction of movement of the punch to form a depression 225. (FIG. 8). Then the blank was transferred to a third die position where another blow, similar to the first blow, caused a first shank 60 with a recess 76 to be formed from one end of the first blank 200, by a backward cold headed extrusion. (FIG. 9A).

c) The cutting, squaring off and punching were done in a single header apparatus manufactured by ASAHI OKUMA. The header was a three die, three blow cold header, with a first station where cutting was done. The header apparatus had a transfer mechanism to move the blank 200 to a first position in the die block where a first blow was delivered to square the blank, then to second and third positions where the subsequent blows formed the recess.

d) The blank 200 was then heat treated at about 400° F. to 500° F. for about 30 to 60 minutes to relieve stresses. An oil quench immediately followed.

e) After heat treating of the first blank 200, a bend was formed in the first blank 200 at a first bending angle C with an apex 147 at a first predetermined distance FPD below an open end 80 of the recess 76 formed from the first blank 200. (FIG. 10A).

f) The other end of the blank 200, that is, the end opposite the end with the opening 80, was flattened to form a base 64 (FIG. 11A) below a bottom of the recess 76 while orienting the blank 200 such that the shank 60, the base 64, the angle C and the apex 147 laid in a common plane CP1. (FIG. 11A).

g) A hole 52a was punched in the base 64. (FIG. 12A).

h) The bending, flattening and hole punching were all conveniently done in a single 150 ton press having a rotary index transfer and manufactured by Niagara.

i) The blank 200 was then heat treated a second time to relieve stresses. The heat treating was conducted at about 900° F. to 1200° F. for about 30 to 60 minutes. An oil quench followed immediately.

j) The process described in steps (a)-(c) above was repeated for a second blank 210 where a recess 122 (FIG. 9B) was formed by the method of the invention, through step (c) as was described previously in reference to the first blank 200.

k) After heat treating of the second blank 210, as per step (d) above, a bending angle D with an apex 148 at a second predetermined distance SPD below an open end 114 of the recess 122 was formed in the second blank 210. (FIG. 10B). The first and second bending angles C, D were each about 15 degrees and the first and second predetermined distances FPD and SPD were equal. (FIGS. 9A, 9B, 10A, 10B).

l) The process as described in steps (f)-(i) was repeated for the second blank 210 so that a second base 130 was formed (FIG. 11B) with a hole 52b (FIG. 12B). The shank 110, base 130, the angle D and the apex 148 were formed in a common plane CP2. The second blank was heat treated as per step (i).

m) After heat treating of the first and second blanks 200, 210, as described in step (i), the first shank 60 was cured at a first curving angle A in a direction which was toward a line LL1 perpendicular to the common plane CP1, such that an apex 92 of the first curving angle A was at a first selected distance FSD below the open end 80 of the recess 72 of the first shank 60, (FIGS. 1, 2, 6 and 13A); and the second shank 110 was curved at a second curving angle B in a direction which was toward a line LL2 perpendicular to the common plane CP2, such that an apex 146 of the second curving angle B was at a second selected distance SSD below the open end 126 of the recess 122 of the second shank 110. (FIGS. 1, 2, 3 and 13B). The second selected distance SSD was greater than the first FSD such that when the base of the first shank 60 of the first leg 56 was placed over the base 130 of the second shank 110 of the second leg 100 with the respective holes 52a, 52b in alignment, the respective recesses 76, 122 were within 10 degrees of being parallel to one another.

n) The first and second legs 56, 100 were secured by being welded together by means of weld joints 150 formed by an MIG welding technique, forming the seat belt anchor 28.

o) The seat belt anchor 28 received a final heat treating in a range of temperatures and at a time sufficient to provide a desired hardness.

The process of Example 1 produced seat belt anchor 28 while generating less than 5% waste of material as compared to 50% or more waste when current forging based processes are used. The method produces anchors 28 at twice the production rate of current forging based methods. The advantages include minimal material waste, economical and relatively cost efficient to manufacture, use and install; proper orientation of the anchor with respect to the seat belt cables, buckle and floor pan of the vehicle to which the anchor is secured.

While the invention has been described with reference to an example, it will be appreciated that others could readily be adopted by one skilled in the art. Accordingly, the scope of the invention is to be considered limited only by the following claims.

We claim:

1. A method of making a seat belt anchor having two recesses defined by respective walls carried by at least one base distal from an open end of each recess, the base being adapted to be secured to the floor of a vehicle and the recesses adapted to receive and retain therein respective seat belt cables, the improvement comprising:
   a) forming first and second elongate metal blanks each having two ends and a longitudinal axis between the ends;
   b) placing each blank in a bore of a die adapted to receive a punch and forcing the punch into the bore in a direction along the longitudinal axis of the blank while permitting the metal of the blank to flow in an annular gap between the punch and the bore in a direction opposite to the direction of movement of the punch, thereby causing a shank with a recess to be formed in one end of the blank;
   c) forming a bend in the first blank at a first bending angle with an apex at a first predetermined distance below an open end of the recess formed from the first blank;
   d) forming a bend in the second blank at a second bending angle with an apex at a second predetermined distance below the open end of the recess formed from the second blank;
   e) flattening the other end of the first blank to form a first base below a bottom of the recess while orienting the first blank such that the first shank, the first base and the first bending angle lie in a common plane;
   f) flattening the other end of the second blank to form a second base below a bottom of the recess while orienting the second blank such that the second shank, the second base and the second bending angle lie in a common plane;
   g) forming a hole in the first and second base;
   h) curving the first shank in a direction which is toward a line perpendicular to the common plane, an apex of the first curving angle being at a first selected distance below the open end of the recess of the first shank to form a first curving angle defined by a longitudinal axis of the first shank and first base;
   i) curving the second shank in a direction which is toward a line perpendicular to the common plane, an apex of the second curving angle being at a second selected distance below the open end of the recess of the second shank to form a second curving angle defined by a longitudinal axis of the second shank and second base, the second selected distance being at least as great as the first, such that when the base of the first shank is placed over the base of the second shank with the respective holes in alignment the respective recesses are within about 10 degrees of being parallel to one another thereby forming the seat belt anchor.

2. A method according to claim 1 steps (c) and (d) wherein the first and second bending angles are each about 10 to about 15 degrees.

3. A method according to claim 1 wherein the first and second bending angles are equal.

4. A method according to claim 1 steps (c) and (d) wherein the first and second predetermined distances are equal.

5. A method according to claim 1 steps (h) and (i) wherein the first and second curving angles are each about 110 to about 140 degrees.

6. A method according to claim 1 steps (g) and (h) wherein the first and second curving angles are equal.

7. A method according to claim 1 wherein after step (b) and before step (c) the first blank is heat treated for at least 30 minutes at about 400° F. to about 500° F.

8. A method according to claim 1 wherein after step (b) and before step (d) the second blank is heat treated for at least 30 minutes at about 400° F. to about 500° F.

9. A method according to claim 1 wherein before step (g) the first blank is heat treated for at least 30 minutes at about 900° F. to about 1200° F.

10. A method according to claim 1 wherein before step (h) the second blank is heat treated for at least 30 minutes at about 900° F. to about 1200° F.

11. A method according to claim 1 wherein after step (i) the seat belt anchor is heat treated at a temperature and for a time sufficient to provide a desired hardness.

12. A seat belt anchor comprising:
   first and second legs each having first and second respective shanks, and first and second bases carrying the first and second respective shanks;
   each of the shanks being elongate, generally tubular, spaced apart, and with a top, a longitudinal axis and an axial recess with an end open to the top;
   the bases each having generally flat top and bottom surfaces;
   the first and second bases joined to the first and second respective shanks at an end of the shank distal from the open end of the recess;
   the axis of the shank and the top surface of the base curved toward one another;
   a first curving angle defined by the longitudinal axis of the first shank and the first base and having an apex which is a first selected distance from the top of the first shank;
   a second curving angle defined by the longitudinal axis of the second shank and the second base and having an apex which is a second selected distance from the top of the second shank, the second selected distance being at least as great as the first distance; and
   the first base disposed over the second base with longitudinal axes of the first and second respective bases being crossed one over another and the first and second shanks constructed and arranged such that the recess of the first shank and the recess of the second shank are spaced apart and within 10 degrees of being parallel to one another.

13. A seat belt anchor according to claim 12 wherein the first and second shanks are each constructed and arranged with respective first and second bending angles, such that the first and second shanks are bent toward one another.

14. A seat belt anchor according to claim 12 wherein the first and second curving angles are each about 110 to about 140 degrees.

15. A seat belt anchor according to claim 12 wherein the first and second curving angles are equal.

16. A seat belt anchor according to claim 12 wherein a weld joint secures the first base to the second base.

17. A seat belt anchor according to claim 13 wherein the first and second bending angles are each about 10 to about 15 degrees.

18. A seat belt anchor according to claim 13 wherein the first and second bending angles are equal.

19. A method of making a seat belt anchor having two recesses defined by respective walls carried by at least one base distal from an open end of each recess, the base being adapted to be secured to the floor of a vehicle and the recesses adapted to receive and retain therein respective seat belt cables, the improvement comprising:
   a) forming first and second elongate metal blanks each having two ends and a longitudinal axis between the ends;
   b) placing each blank in a bore of a die adapted to receive a punch and forcing the punch into the bore in a direction along the longitudinal axis of the blank while permitting the metal of the blank to flow in an annular gap between the punch and the bore in a direction opposite to the direction of movement of the punch, thereby causing a shank with a recess to be formed in one end of the blank;
   c) flattening the other end of the first blank to form a first base below a bottom of the recess while orienting the first blank such that the first shank, the first base and the first bending angle lie in a common plane;
   d) flattening the other end of the second blank to form a second base below a bottom of the recess while orienting the second blank such that the second shank, the second base and the second bending angle lie in a common plane;
   e) punching a hole in the first and second base;
   f) curving the first shank in a direction which is toward a line perpendicular to the common plane, an apex of the first curving angle being at a first selected distance below the open end of the recess of the first shank to form a first curving angle defined by a longitudinal axis of the first shank and first base;
   g) curving the second shank in a direction which is toward a line perpendicular to the common plane, an apex of the second curving angle being at a second selected distance below the open end of the recess of the second shank to form a second curving angle defined by a longitudinal axis of the second shank and second base, the second selected distance being as least as great as the first, such that when the base of the first shank is placed over the base of the second shank with the respective holes in alignment the respective recesses are within about 10 degrees of being parallel to one another thereby forming the seat belt anchor.

* * * * *